United States Patent [19]
Schwartz et al.

[11] Patent Number: 4,747,882
[45] Date of Patent: May 31, 1988

[54] PROCESS FOR THE DIRECT PRODUCTION OF PRINTING INKS

[75] Inventors: Russell J. Schwartz, Cincinnati, Ohio; James Keightley, Mundeline, Ill.

[73] Assignee: Sun Chemical Corporation

[21] Appl. No.: 36,187

[22] Filed: Apr. 9, 1987

Related U.S. Application Data

[63] Continuation of Ser. No. 711,197, Mar. 13, 1985, abandoned, which is a continuation-in-part of Ser. No. 461,379, Jan. 27, 1983, abandoned.

[51] Int. Cl.⁴ .............................................. C09D 17/00
[52] U.S. Cl. ...................................... 106/309; 106/23; 106/308 Q
[58] Field of Search ............... 106/309, 23, 22, 308 Q, 106/308 B

[56] References Cited
U.S. PATENT DOCUMENTS

| | | | |
|---|---|---|---|
| 3,705,044 | 12/1972 | Pipkins | 106/20 |
| 4,001,027 | 1/1977 | Lankes, Jr. | 106/31 |
| 4,300,954 | 11/1981 | de Monterey et al. | 106/309 |
| 4,309,223 | 1/1982 | Rouwhorst | 106/309 |
| 4,309,320 | 1/1982 | Arora et al. | 106/235 |
| 4,427,810 | 1/1984 | Chisvette et al. | 106/308 Q |

*Primary Examiner*—Amelia Burgess Yarbrough
*Attorney, Agent, or Firm*—Ostrolenk, Faber, Gerb & Soffen

[57] ABSTRACT

A direct process for the production of a printing ink is carried out in a single vessel and consists essentially of the steps of (1) mixing a pigment slurry with a non-aqueous hydrophobic ink vehicle under agitation and with heating in a mixer equipped with concentrically arranged mixing elements and high-speed impeller blades to transfer the pigment from the aqueous phase to the non-aqueous phase, (2) removing the aqueous phase from the mixer, and (3) adding to the non-aqueous phase in the mixer additional ingredients to produce a press-ready printing ink. The finished ink can then be discharged, for example, through a port in the bottom of the mixer.

17 Claims, 2 Drawing Sheets

PROCESS FOR THE DIRECT PRODUCTION OF PRINTING INKS

This application is a continuation of 711,197, filed Mar. 13, 1985, now abandoned which is a continuation-in-part of application Ser. No. 461,379, filed Jan. 27, 1983.

BACKGROUND OF THE INVENTION

Printing inks are conventionally prepared by a series of steps that comprise (1) reacting the starting ingredients for the pigment in an agitated vessel to obtain a slurry containing about 1 to 3 percent of pigment in mother liquor, (2) filtering and washing the liquid reaction product of step (1) with water to remove the mother liquor and decrease the amount of water-soluble by-products to an acceptable level, forming a presscake that contains about 20 percent of pigment and 80 percent of water, (3) putting the presscake from step (2) into a high horsepower, high shear mixer for at least 15 hours to transfer the pigment from the aqueous phase to a non-aqueous phase and to effect complete dispersion of the pigment in the non-aqueous phase, and (4) finally adjusting the batch by adding materials to insure proper rheology and color characteristics to meet the requirements of the printing ink manufacturer.

The pigment flush product from step (4) is then sold to the manufacturer of printing inks who then, at a different location, (5) mixes the pigment with additional varnish, e.g., resin, solvent, and, optionally, a drying oil, and conventional additives to prepare a printing ink that meets the customer's requirements.

Alternately, the pigment presscake from step (2) may be dried, the dry product mixed with the non-aqueous components, and the resulting paste subjected to high shear in dispersion equipment, such as a three-roll mill.

BRIEF DESCRIPTION OF THE INVENTION

It has now been found that a press-ready printing ink with improved properties can be made in less time and at a reduced cost by a direct process that is carried out in a single vessel and consists essentially of the steps of (1) mixing a pigment slurry which contains about 0.5 to 15 percent of pigment with a non-aqueous hydrophobic varnish or oil in a mixer and, with the application of heat, transferring the pigment from the aqueous phase to the non-aqueous phase, (2) draining the aqueous phase from the vessel and, if necessary, removing the remaining water from the mixture by the application of heat and vacuum, and (3) mixing further ink ingredients into the vessel to produce a press-ready printing ink.

Figure 1:
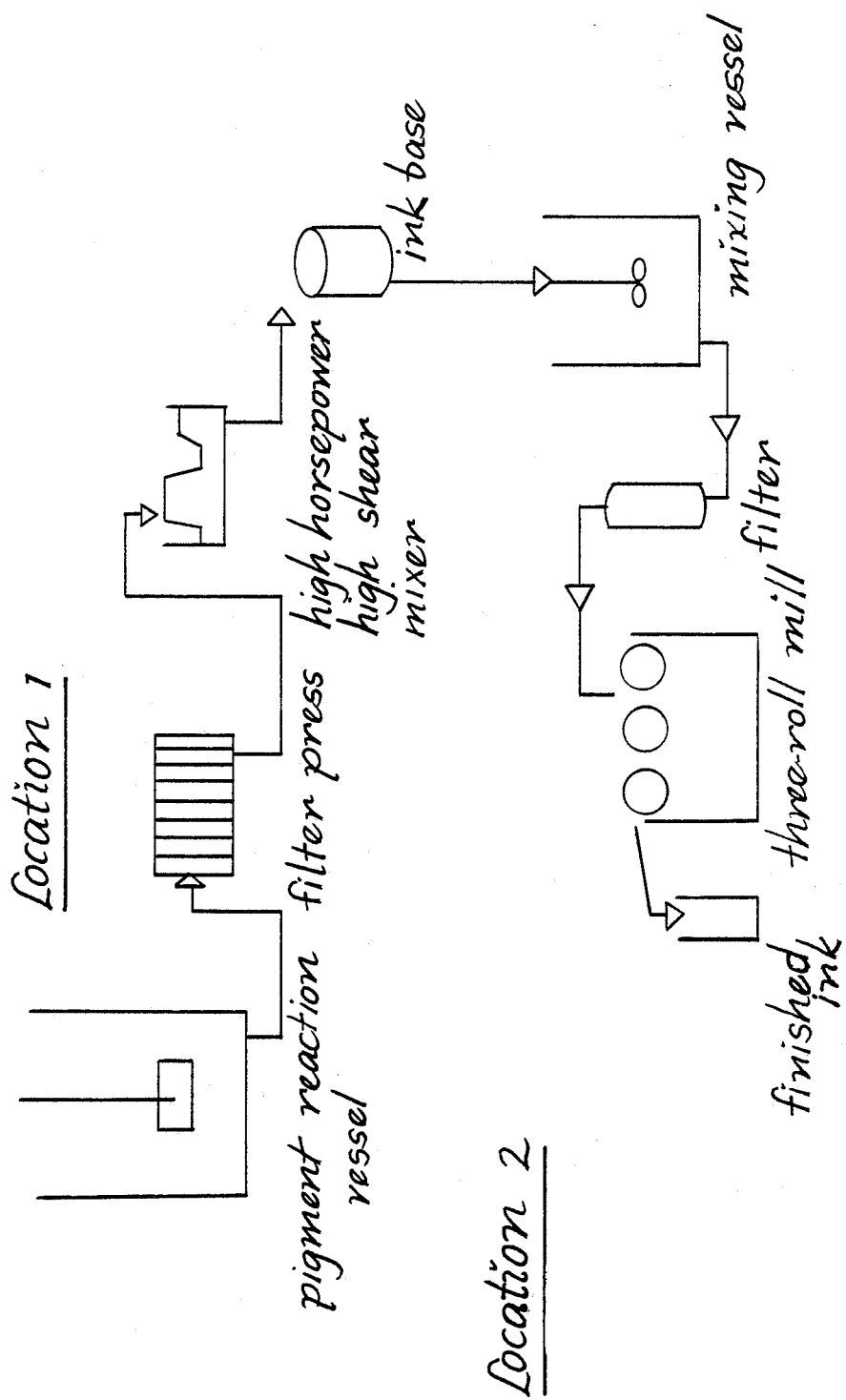
FIG. 1 is a flow diagram of the conventional process for manufacturing printing inks.
Figure 2:
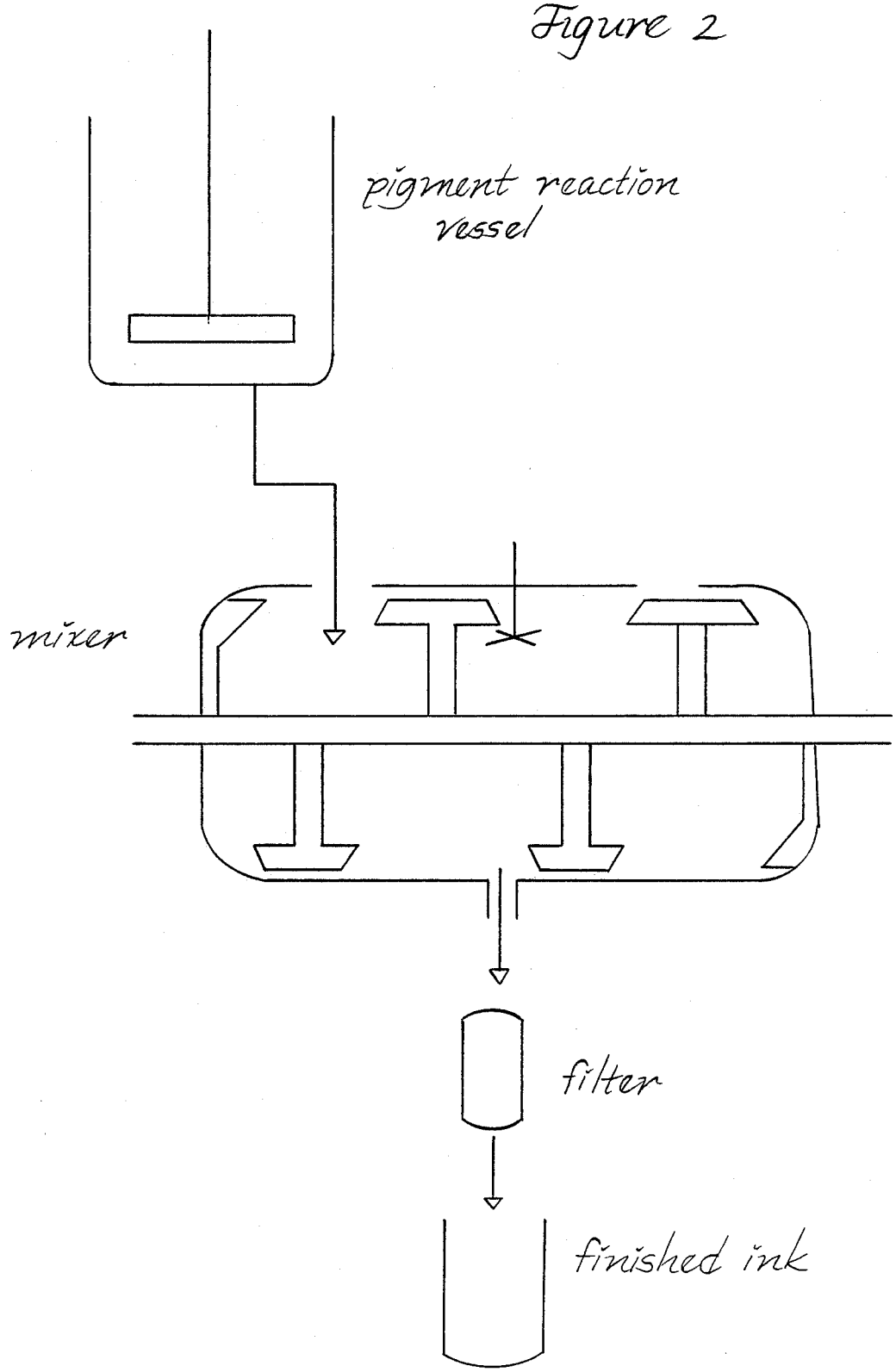
FIG. 2 is a flow diagram of the process of this invention for manufacturing printing inks.

DETAILED DESCRIPTION OF THE INVENTION (1) A pigment slurry containing about 0.5 to 15 percent of pigment is fed into a cylindrical horizontal mixer with concentrically arranged mixing elements and equipped with high-speed impeller blades; a heating source, generally, but not exclusively, steam; a thermometer; an outlet at the base of the cylinder; and a means of drawing vacuum.

A hydrophobic varnish or oil is fed into the vessel in the proportions between about 3:1 and 1:4 pigment:varnish. The mixture is heated with agitation using the concentric mixing blades until the pigment transfers to the non-aqueous phase. The clear aqueous phase is discharged through the port at the bottom of the mixer, while the organic phase remains as a cohesive mass, adhering to the surfaces of the mixer.

Optionally, fresh water is added to the vessel and agitated and then drained in the same manner to remove soluble impurities. The wash step can be repeated until the level of impurities is acceptably low. Optionally, after draining the aqueous phase from the vessel, the non-aqueous phase can be heated under vacuum to remove any remaining water from the vessel. Optionally, during or subsequent to drying, increased pigment dispersion may be achieved by additional mixing, using the concentrically arranged mixing elements in combination with the high-speed impeller blades.

(2) Further varnishes, solvents, driers, and other conventional additives are added to the vessel and mixed with the pigment mass to produce an ink.

The amounts of the additives vary with the desired properties of the finished ink, but generally they are used in amounts up to about 3 percent, and preferably about 1 percent, based on the weight of the finished ink.

Typical resins used in these varnishes include, but are no limited to, hydrocarbons, alkyds, phenolics, modified phenolics, rosin esters, modified rosin, esters, and the like, and mixtures thereof, in an amount in the range of about 25 to 70 percent, based on the weight of the oils.

A drying oil may be included in order to initially aid water breakout and to improve press characteristics. Typical oils include linseed, soya, proprietary drying varnishes, and the like, and their mixtures in an amount between about 5 and 25 percent, and preferably between about 5 and 10 percent, based on the weight of the total varnish.

The process of this invention is "system-specific," that is, the specific materials selected and the amount of each depend upon the requirements of each customer.

(3) The finished ink or ink base containing from about 5 to 65 percent of pigment is then discharged, for example through the bottom of the mixer. Optionally, the ink is passed through a filtering unit before packing.

The direct process of this invention is applicable to any pigment, generally organic, that is used in printing inks. Specific examples include, but are not limited to, Mono and Diarylide Yellows, Lithol Rubine, Permanent Red 2B, Lithol Reds, Red Lake C, and Phthalocyanine Blue.

This process is applicable to any ink system in which the essential vehicle is immiscible with water, such as for example offset or lithographic, publication gravure, and some packaging gravure and flexographic ink systems.

The total time that the material is in the vessel, from when the pigment slurry is placed in the vessel until the finished printing ink is removed, is about 4 to 12 hours.

As a result of using the process described herein, printing inks are obtained that have considerably improved properties. In addition, major economies have been effected in time, energy consumption, and money. By flushing the pigment slurry directly in the mixer, the need for an intermediate isolation step is eliminated and, therefore, the effluent from washing the pigment is much less than from the conventional process. Use of an expensive heavy-duty sigma blade mixer is eliminated, and the amount of electricity used is much reduced. The amount of material wasted due to handling of the pigment and flush in the conventional process is also reduced by the process of this invention, i.e., the amount of raw materials required is less than the amount required in the conventional process to produce the same color strength.

The end product is superior to an ink made by the conventional process in properties such as color strength, gloss, transparency, cleanliness of hue, and dispersibility, and the quality of the ink is consistent.

The process of this invention will be further illustrated by the following examples wherein all parts and percentages are by weight unless otherwise specified:

EXAMPLE 1

1316 Parts of Yellow 12 slurry containing 100 parts of Yellow 12 pigment was added to a cylindrical horizontal mixer with concentrically arranged mixing elements and equipped with high-speed impeller blades, a heating source, a thermometer, an outlet at the bottom of the cylinder, and a means of drawing vacuum, and 200 parts of quickset vehicle was added. The mixture was heated to 50° to 60° C. and mixed until the pigment had transferred to the organic phase and the aqueous phase was clear. The aqueous phase was drained from the vessel 1000 Parts of fresh water was added to the mixer, mixed for 5 minutes, and then drained from the mixer. The wash step was repeated 4 times.

The mixer was then held under a vacuum of 26 inches mercury at 50° to 55° C. for 0.5 to 1.5 hours or until all of the water had been removed from the mixer.

To the mass in the mixer were mixed in 5 parts of hexyl carbitol softening agent, 4 parts of anti-skinning agent, 68 parts of a wax compound, 1150 parts of gelled quickset vehicle, and 175 parts of Magie 470 oil.

The product was a yellow lithographic printing ink having superior properties.

EXAMPLE 2

1110 Parts of Lithol Rubine slurry containing 100 parts of Pigment Red 57 was added to a mixer as described in Example 1, and 154 parts of a quickset vehicle was added. The mixture was heated to 6° to 70° C. and mixed until the pigment had transferred to the organic phase and the aqueous phase was clear.

The aqueous phase was drained from the mixer.

1000 Parts of fresh water was added to the mixer, mixed for 5 minutes, and then drained from the mixer. The wash step was repeated a total of 4 times.

The mixer was then held under a vacuum of 26 inches mercury at 60° to 70° C. for 0.5 to 1.5 hours or until all of the water had been removed from the mixer.

To the mass in the mixer were mixed in 5 parts of hexyl carbitol softening agent, 4 parts of anti-skinning agent, 26 parts of a wax compound, 384 parts of gelled quickset vehicle. and 4 parts of Magie 470 oil.

The product was a red lithographic printing ink having superior properties.

EXAMPLE 3

1110 Parts of Phthalocyanine Blue slurry containing 100 parts of Phthalocyanine Blue was added to a mixer as in Example 1 to which 140 parts of a quickset vehicle was added. The mixture was heated to 60° to 70° C. and mixed until the pigment had transferred to the organic phase and the aqueous phase was clear. The aqueous phase was drained from the vessel.

100 Parts of fresh water was added to the vessel, mixed for 5 minutes, and then drained from the vessel. The wash step was repeated a total of 4 times.

The vessel was then held under a vacuum of 26 inches mercury at 60° to 70° C. for 0.5 to 1.5 hours or until all the water had been removed from the vessel.

To the mass in the mixer were mixed in 5 parts of hexyl carbitol softening agent, 4 parts of anti-skinning agent, 44 parts of a wax compound, 773 parts of gelled quickset vehicle, and 11 parts of tridecyl alcohol.

The product was a blue lithographic printing ink having siperior properties.

EXAMPLE 4

3 Parts of Diarylide Yellow pigment slurry and 1 part of a publication gravure vehicle (a limed zincated tall oil rosin soap) were stirred under low-speed agitation. After about 15 to 20 minutes, the ingredients were combined, first as small agglomerates and then, with continued gentle agitation, as a continuous, uniform fluid. Upon standing, the phase containing the pigment rose to the top of the container; the bottom phase was a clear aqueous solution of water-soluble salts.

The water phase was decanted off, and fresh water was added. Agitation was resumed to intermix the phases which were then allowed to separate; the water phase with additional water-soluble salts was removed. Then the mixture was heated under vacuum, and the remaining water was removed by azeotropic distillation. The solvent that had been removed was subsequently returned to the batch.

The product was a yellow publication gravure ink having superior properties.

EXAMPLE 5

The procedure of Example 1 was repeated except that the quickset vehicle was replaced by each of the following: a heat-set vehicle, a sheet-fed offset vehicle, a web offset vehicle, and a letterpress vehicle. The results were comparable.

The process of this invention has many advantages over previously known processes. These include simplicity of operation, savings in time and labor, reduction in raw material losses, increased rate of production, increased productive capacity, uniformity of resulting products, and production of superior quality products.

A number of processes have been disclosed in the art for flushing by mixing pigment presscakes with suitable hydrophobic vehicles. These processes are usually batch-type operations using sigma blade mixers. Such processes are very energy- and labor-intensive. For example, in U.S. Pat. No. 4,309,320 Arora et al. effected the transfer by merely kneading the presscake and vehicle together until substantially all of the water had separated out.

In addition, the phase transfer has been effected by "forcing" the aqueous pigment pulp and organic vehicle into a smaller volume, as is shown by Rouwhorst et al. in U.S. Pat. No. 4,309,223 and by de Monterey et al. in U.S. Pat. No. 4,300,954. In accordance with the process of this invention, the entire operation may be carried out within a large free volume which thereby allows the final ink formulation to be prepared without the need for additional equipment, such as pre-mixers as disclosed by Rouwhorst et al. or separate letdown tanks as disclosed by de Monterey et al. and Arora et al.

What is claimed is:

1. A direct process for the production of a printing ink that is carried out in a single vessel and consists essentially of the steps of (1) mixing under agitation a pigment slurry which contains about 0.5 to 15 percent of pigment with a non-aqueous hydrophobic ink vehicle in a mixer equipped with concentrically arranged mixing elements and high-speed impeller blades and heating to transfer the pigment from the aqueous phase to the non-aqueous phase, (2) removing the aqueous phase from the mixer, and (3) adding additional ink-making ingredients to the mixer to produce a press-ready printing ink.

2. The process of claim 1 wherein the mixer is cylindrical and horizontal.

3. The process of claim 1 wherein the finished ink contains about 5 to 65 percent of pigment.

4. The process of claim 1 wherein the ratio of amounts of pigment and hydrophobic vehicle is in the range of about 3:1 to 1:4 pigment:vehicle.

5. The process of claim 1 wherein the pigment slurry and hydrophobic vehicle are heated at about 5° to 70° C.

6. The process of claim 1 wherein the pigment is organic.

7. A printing ink prepared by the process of claim 1.

8. The process of claim 1 further comprising washing the non-aqueous phase containing pigment with water to remove soluble impurities.

9. The process of claim 1 wherein the aqueous phase is removed by draining the aqueous phase then heating under vacuum to remove any remaining water.

10. The process of claim 1 further comprising filtering the press-ready printing ink.

11. A direct process for the production of a printing ink that is carried out in a single vessel and consists essentially of the steps of (1) mixing under agitation an organic pigment slurry that contains about 0.5 to 15% of pigment with a non-aqueous hydrophobic ink vehicle, wherein the ratio of amount of pigment and hydrophobic vehicle is in the range of about 3:1 to 1:4 pigment:vehicle, in a mixer equipped with concentrically arranged mixing elements and high-speed impeller blades and heating to transfer the pigment from the aqueous phase to the non-aqueous phase, (2) removing the aqueous phase from the mixer, and (3) adding additional ink-making ingredients to the mixer to produce a press-ready printing ink which contains about 5 to 65% of pigment.

12. The process of claim 11 wherein the pigment slurry and hydrophobic vehicle are heated at about 50°–75° C. and wherein the non-aqueous phase containing pigment is washed with water to remove soluble impurities.

13. The process of claim 12 wherein said organic pigment slurry is a Yellow 12 pigment slurry.

14. The process of claim 12 wherein said organic pigment slurry is a Lithol Rubine pigment slurry.

15. The process of claim 12 wherein said organic pigment slurry is a phthalicyamine pigment slurry.

16. The process of claim 12 wherein said organic pigment slurry is a Diarylide Yellow pigment slurry.

17. The process of claim 12 wherein the mixer is cylindrical and horizontal, the aqueous phase is removed from the mixer by draining the aqueous phase and then heating under vacuum to remove any remaining water and wherein the press-ready printing ink is filtered.

* * * * *